Figure 1:
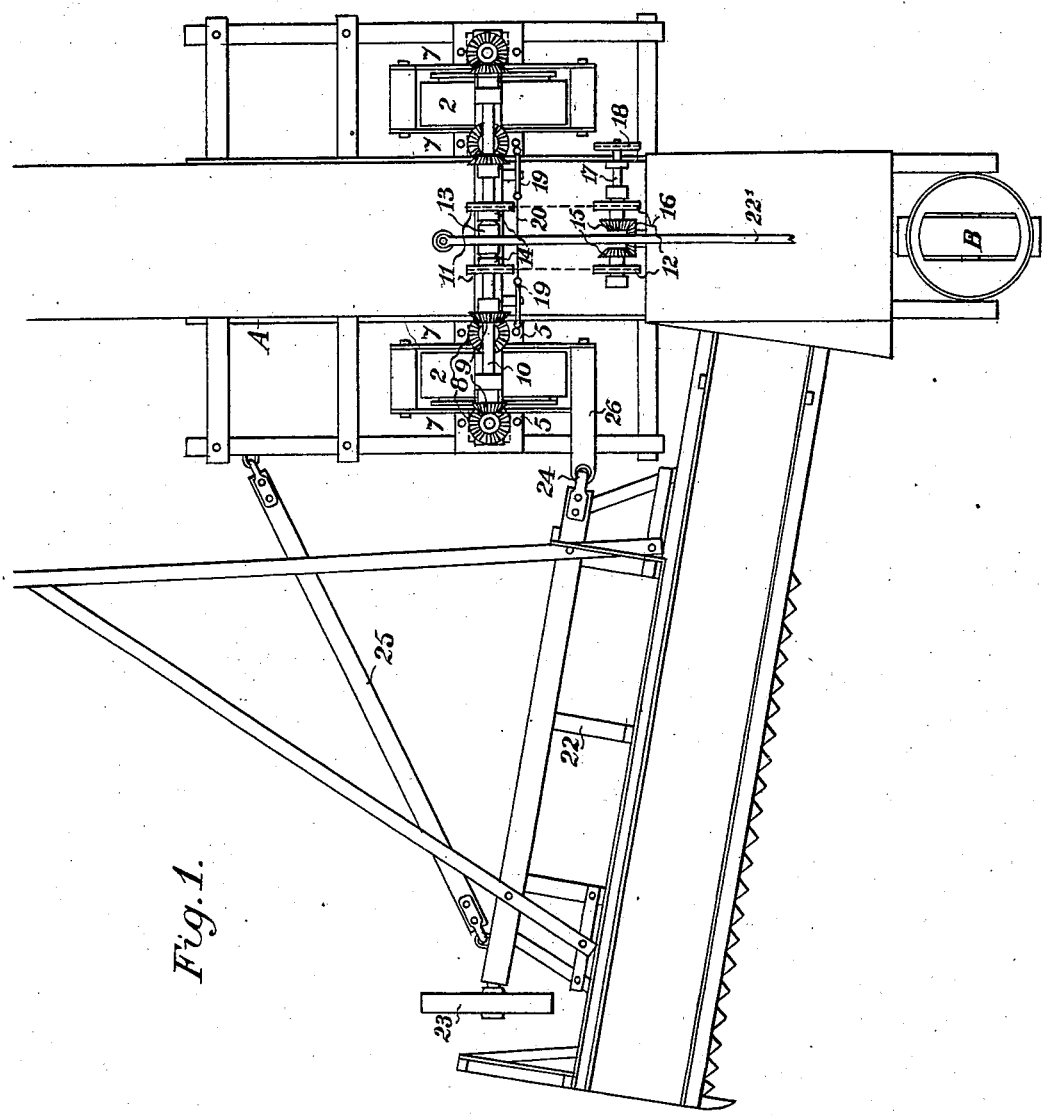

No. 723,474. PATENTED MAR. 24, 1903.
W. C. MATTESON.
TRAVELING HARVESTER.
APPLICATION FILED DEC. 18, 1899.
NO MODEL. 3 SHEETS—SHEET 1.

Witnesses, Inventor,
Walter C. Matteson
By Dewey Strong & Co.

No. 723,474. PATENTED MAR. 24, 1903.
W. C. MATTESON.
TRAVELING HARVESTER.
APPLICATION FILED DEC. 18, 1899.
NO MODEL. 3 SHEETS—SHEET 2.
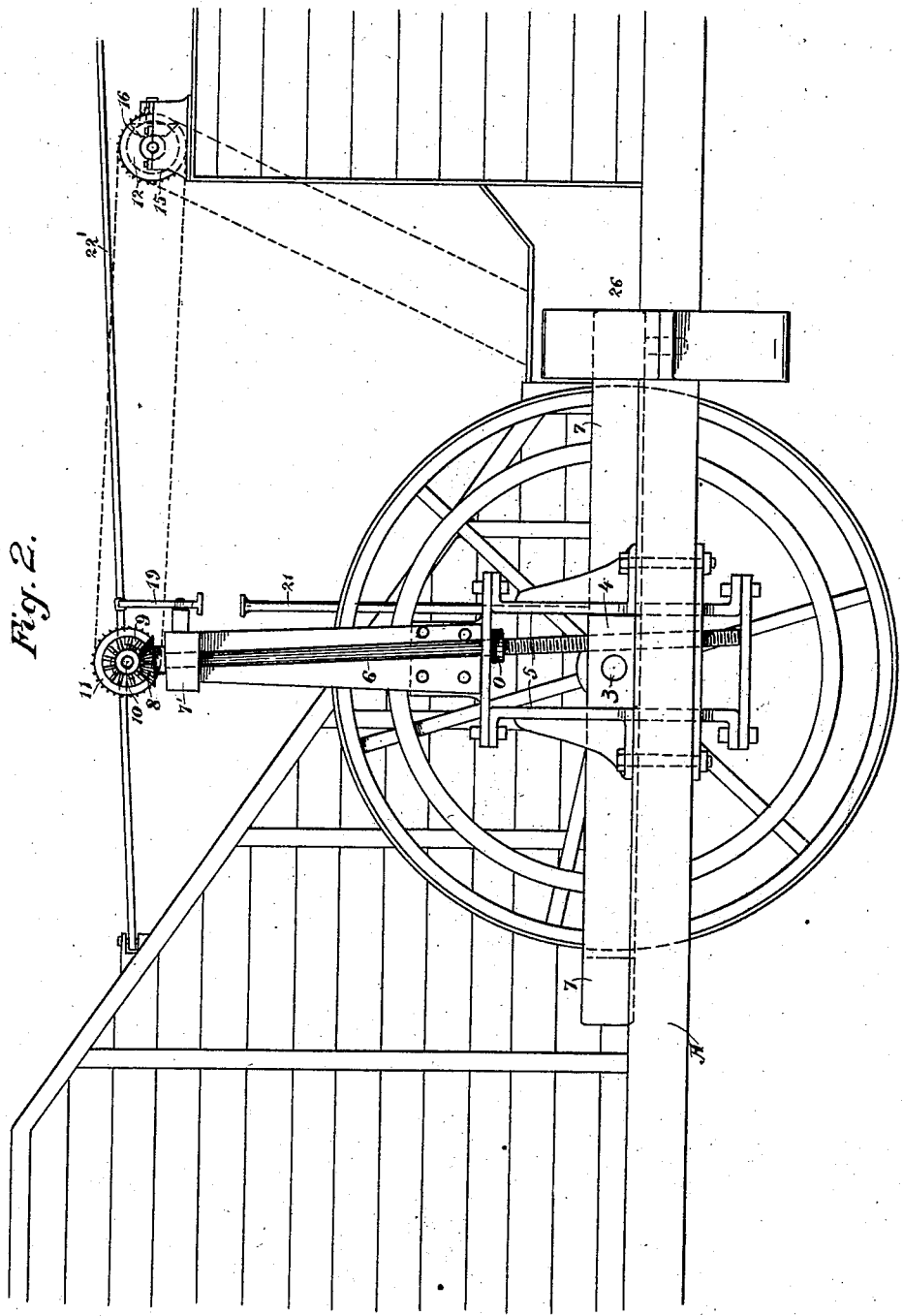

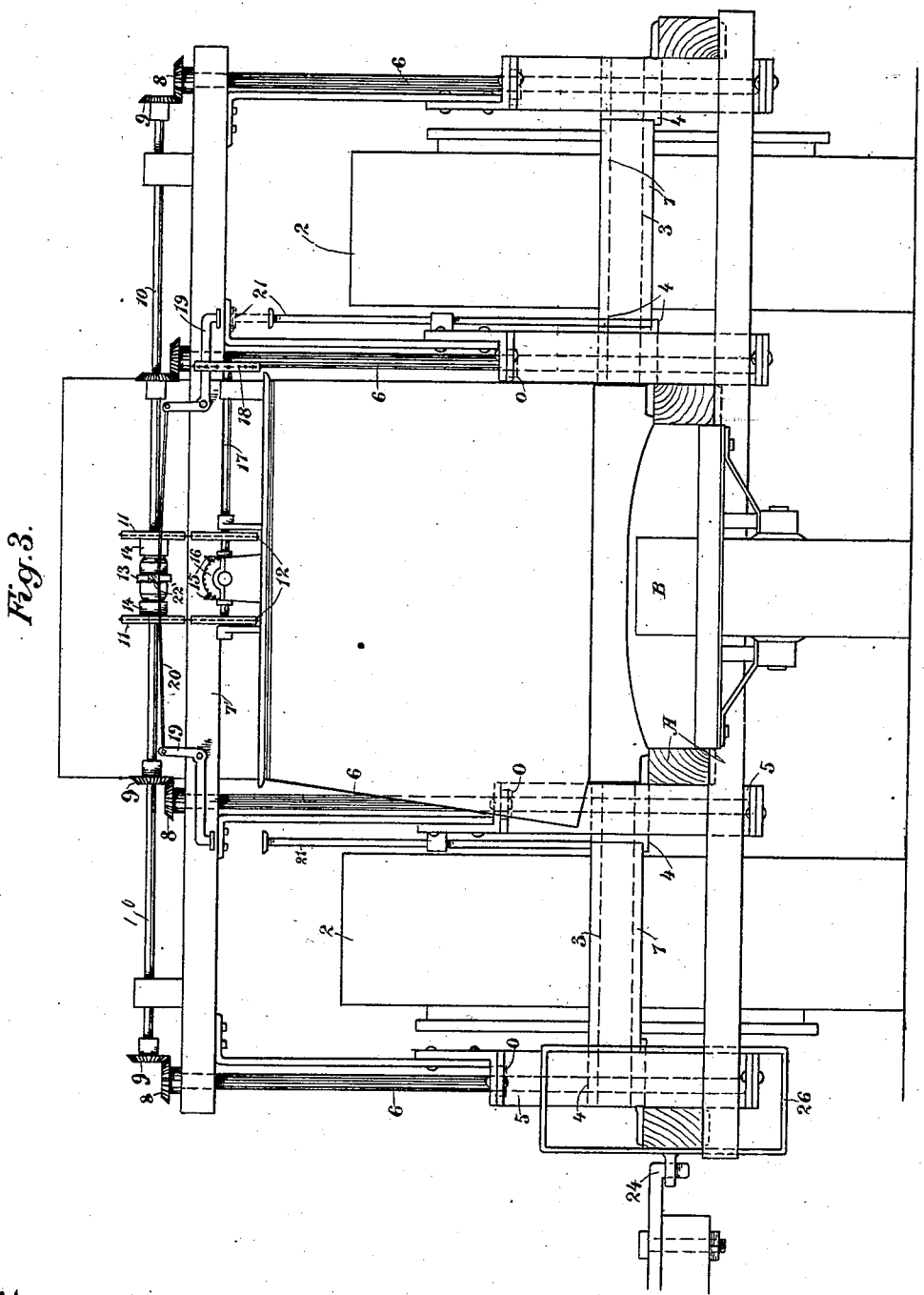

UNITED STATES PATENT OFFICE.

WALTER CORLOS MATTESON, OF STOCKTON, CALIFORNIA, ASSIGNOR TO THE HOLT MANUFACTURING COMPANY, OF STOCKTON, CALIFORNIA, A CORPORATION OF CALIFORNIA.

TRAVELING HARVESTER.

SPECIFICATION forming part of Letters Patent No. 723,474, dated March 24, 1903.

Application filed December 18, 1899. Serial No. 740,737. (No model.)

*To all whom it may concern:*

Be it known that I, WALTER CORLOS MATTESON, a citizen of the United States, residing at Stockton, county of San Joaquin, State of California, have invented an Improvement in Traveling Harvesters; and I hereby declare the following to be a full, clear, and exact description of the same.

My invention relates to improvements in apparatus designed to cut, thresh, clean, and sack grain.

It consists in a mechanism which I will hereinafter describe and claim by which the apparatus is enabled to travel upon side hills and maintain the body of the threshing and cleaning machine in a horizontal position and the wheels in a vertical position at all times whatever may be the inclination or variation of inclination of the ground upon which the machine is working.

It also comprises details of construction by which the machine is operated.

Referring to the accompanying drawings, Figure 1 is a plan view of a harvester embodying my invention. Fig. 2 is an enlarged view of the bearing-wheel and the actuating mechanism whereby it is raised and lowered. Fig. 3 is an end view of the thresher and its frame.

The object of my invention is to enable a traveling harvester and thresher to be used upon side hills of any description and maintain the frame of the thresher and cleaner at all times in a horizontal position and at the same time maintain the bearing-wheels in a vertical plane.

In the present drawings I have only shown so much of the outlines of a well-known traveling harvester, thresher, and cleaner as will enable my present invention and its connection therewith to be clearly understood, leaving out all unnecessary wheels, belts, and gears by which the various portions of the machinery within are driven, but which are of common knowledge to every one familiar with this class of machinery.

A represents the main frame of the thresher portion of the machine. 2 2 are the bearing-wheels of this portion, having journal-shafts 3 upon which each wheel is carried. The ends of these journal-shafts turn in boxes 4, which are carried by vertically-movable guides 5, and these boxes travel, so that they may be raised or depressed, carrying with them the wheels to which they appertain. One pair of these boxes is adapted to carry the journal-boxes of one of the wheels 2 and the other pair to carry the journal-boxes of the other wheel, and these boxes are so connected that they may be operated in unison, one being raised and the other depressed, so that when the machine arrives at any sloping ground this mechanism is operated so as to depress the wheel which is in line with the lower portion of the ground and to raise the wheel which is upon the line with the upper portion of the ground, and this change in position of the wheels will maintain the frame A and the threshing, separating, and cleaning mechanism in an approximately horizontal position, which is important in order to prevent this mechanism from being tilted to one side, and thus throwing the body of grain and material which is passing through the machine to one side or the other of the cleaning mechanism, which, if allowed to occur, tends to accumulate the material in masses, which prevents a thorough cleaning thereof.

The larger part of the weight of the threshing and cleaning mechanism is supported upon the wheels 2. The front of this part of the machine is carried upon a steering-wheel B in the manner usual to this class of machines.

In order to operate the leveling devices, I have shown the vertically-disposed screws 6, having the upper end of the screw-shanks journaled in the top frame 7' of the machine and the threaded portions of the screws passing through the boxes 4 or through some connected part or carrier which is movable within the guides 5.

Various devices may be employed to raise and lower the wheels in unison, so that the wheel on one side will be elevated and the other depressed, and such devices will readily suggest themselves to those familiar with the art. The connections by which the journal-boxes are carried I term "wheel-frames" in distinction from the main and other frames of the machine. These may also be variously arranged, the object in any arrangement being to so connect the boxes with the actuating-screws that the movements of the screws will raise and lower the wheels in opposite directions at the same time. I have here shown one form in which the screws, boxes, guides, and braces form vertical inclosing frames for the wheels, and I have also shown horizontal frames 7, connected with and carried by the journal-boxes 4 or connected parts, for a purpose to be hereinafter described. As herein shown, the guides 5 are secured to the timbers of the thresher-frame at each side of the wheels 2, and suitable braces or supports extend upward to a transverse timber or support for the horizontal shaft 10. As the weight of the thresher-frame must be supported by the wheels through the boxes 4 and the screws 6, I have shown collars O, fixed to the screw-shanks just below the transverse upper parts of the guides 5, through which the screw-shanks pass, and as the guides are fixed to the thresher-frame the weight of the machine is supported upon these collars, and the driving-gears, hereinafter described, are relieved from pressure. These collars could be fixed near the upper ends of the screw-shanks, so that the top of the frame would rest upon them. At the top of the screw-shanks are the beveled gears 8, and these are engaged by bevel-gears 9, fixed upon a horizontal shaft 10, which extends across the machine and is suitably journaled thereon, as shown. One pair of the gears 8 and 9 is so mounted with relation to each other that they operate the corresponding screws 6, which carry one of the wheels to raise that wheel, and the other pair is simultaneously turned to depress the wheel carried by them, thus maintaining the machine approximately level, as before described. With any change of the angle or grade of the ground over which the machine is passing the shaft 10 is turned either in one direction or the other, and through the gears the screws are revolved to raise one wheel and lower the other to suit the change in grade. This mechanism may be operated in various ways. I have here shown sprocket-wheels 11, mounted upon the shaft 10, and by chains connecting with other sprocket-wheels 12, mounted upon the machine, so as to be driven by some rotating part of the machine, this motion will be transmitted to rotate the shaft 10. In order to reverse the movements of this shaft and drive it in either direction, as the grade requires, I employ any suitable reversing or clutch mechanism, such as is illustrated at 13, and by means of a suitable lever the driven member of the clutch may be shifted, so as to engage with either one of the members, which are rotated in opposite directions. The clutch member 13 is fixed to the shaft 10, and the corresponding clutch members 14 are connected with the sprocket-wheels 11 and are loose upon the shaft. The sprocket-wheels 12 are connected and turnable in unison with bevel-gears 15, and these gears are engaged by a similar bevel-gear 16, which by its engagement turns the gears 15 in opposite directions, and power transmitted by chains from sprocket-wheels 12 to the sprocket-wheels 11 in like manner turns the clutch members 14 in opposite directions. Power to drive the nest of gears 14 and 16 may be derived from any suitable moving part of the mechanism by means of a shaft 17 and a sprocket, belt-wheel, or gear 18. The parts being thus in motion and the clutch members 14 turning in opposite directions, the member 13 may be shifted, being slidable upon a feather, so as to engage with either one of the clutch members 14, one of which will turn the shaft 10 in one direction and the other engagement will turn it in the opposite direction, so that when engaged to turn in one direction the screws 6 will be turned so that moving through the boxes they will raise the bearing-wheel on one side and correspondingly depress the one upon the other side. This movement is carried on sufficiently to keep the threshing and cleaning portion of the machine approximately level, and any change of grade may be made by a further movement of this mechanism. If the grade change so that it is necessary to reverse the movement, the clutch member 13 is moved into engagement with the oppositely-rotating member 14 and a reverse movement of the screws will be effected, with the corresponding effect upon the bearing-wheels and the body of the machine. When any adjustment has been made which is sufficient for the time, the member 13 is disengaged from both the members 14 and remains between the two, not being acted upon by either.

In order to limit the movement of the leveling-gear, so that it may not accidentally run too far, I have shown bell-crank levers 19 so fulcrumed with relation to the movable clutch member that they can be connected with it or its actuating-lever 22' by rods 20, which connect with one arm of each of the bell-crank levers. The other arm of each of these levers is to be actuated by a rod 21, connected with one of the wheel-frames or part movable therewith, so that when the wheels have reached their limit of movement in either direction they will act, through the rods 20 and 21 and bell-crank levers 19, to automatically move the clutch member 13 out of engagement with the member 14 with which it may have been previously engaged. This stops further movement of the parts until the operator again makes the connection by means of the hand-lever by which the clutch member 13 is normally operated.

The header-frame 22 is of the usual or any suitable construction. The outer end is supported upon a bearing-wheel 23, and the inner end is connected with the threshing-machine by a flexible joint 24, as will be hereinafter described. A brace 25 is hinged or flexibly connected with the rear portion of the frame of the thresher and the front end similarly connected with the header-frame near its bearing-wheel. This brace prevents the header-frame from swinging around about its loose connection with 24.

In order to keep the front of the header and the sickle-bar, which is carried thereby, in proper position parallel with the ground, it is necessary to raise or lower the inner end of the header-frame to correspond with the various movements of the bearing-wheels of the threshing-machine as these wheels are raised or lowered to keep the thresher level. This may also be done in various ways. I have here shown a yoke 26, which is connected with some part of the wheel-frame upon the side adjacent to the header, so as to be movable with it, and this frame and the yoke may be suitably braced to resist the weight of the strain which may be brought upon the header-frame.

It will be seen that when the main bearing-wheels are moved to level the threshing-machine frame the yoke, and with it the inner end of the header-frame, which is connected therewith, will partake of the movement of the wheel and will always maintain the sickle-bar parallel with the ground whether the threshing-machine frame be higher or lower upon that side. This insures an even cut of the grain from one end of the sickle to the other; but this adjustment does not interfere with the raising and lowering of the sickle so as to cut high or low grain, this movement being accomplished by the usual or any suitable mechanism employed for that purpose in harvesters. The grain which is cut by the sickle falls upon a transversely-traveling belt or draper at the rear of the sickle and is carried by it and a hinged connecting-spout into the "feeder-house," as it is termed, from which the grain and straw is delivered to the threshing-cylinder and thence to the other part of the threshing-machine in the manner usual to such machines, these parts not being shown in my present drawings.

Having thus described my invention, what I claim as new, and desire to secure by Letters Patent, is—

1. In a traveling harvester and in combination with a threshing-machine frame thereof, bearing-wheels having independent shafts, journal-boxes in which the ends of said shafts are turnable, guides in which said boxes are carried, and movable, and upright screws extending through correspondingly-threaded openings in the journal-boxes and turnable with relation to each of the pairs of wheel-boxes, and mechanism by which said screws are rotated whereby the boxes of one wheel are elevated and those of the other wheel simultaneously depressed.

2. In a traveling harvester and in combination with the threshing-machine frame thereof, bearing-wheels upon opposite sides of the frame having independent shafts and journal-boxes therefor, guides in which said journal-boxes are carried, screws, the shanks of which are turnable through threaded openings in the journal-boxes to move them, a shaft journaled across the frame of the machine having beveled gears fixed thereto, corresponding gears fixed upon the screw-shanks and engaging with the gears of the shaft, and means for rotating the shaft in either direction, said means consisting of clutch members loosely turnable in opposite directions upon the transverse shaft, an intermediate clutch member slidable upon a feather on the shaft and a lever by which it may be engaged with either of the other members.

3. In a traveling harvester, and in combination with a threshing-machine frame thereof, bearing-wheels upon opposite sides of the frame having independent shafts and journal-boxes therefor, guides in which said boxes are movable up and down, screw-shafts turnable with relation to the boxes so as to raise and lower the boxes with relation to the threshing-machine frame, beveled gears upon the upper ends of the screw-shafts, a horizontal shaft 10 journaled upon the threshing-frame and having corresponding gears engaging those of the screw-shafts, a shaft 17 having oppositely-revolving sprocket-wheels, driving clutch members on the horizontal shaft and a clutch member slidable upon said shaft to engage either of the driving members of the clutch, sprocket-wheels on the driving clutch members and chains connecting the sprocket-wheels of one shaft with those of the other shaft.

4. In a traveling harvester and in combination with the threshing-machine frame thereof, bearing-wheels upon opposite sides of the frame having independent shafts and journal-boxes therefor, mechanism by which the journal-boxes of one wheel may be raised and the other simultaneously depressed to maintain the level of the threshing-machine, a header-frame having a bearing-wheel at its outer end, a yoke connected and movable with the journal-box of the adjacent bearing-wheel of the threshing-machine, a flexible connection between the inner end of the header-frame and said yoke, and a flexibly-connected brace-bar extending from the outer end of the header-frame to the rear of the threshing-machine frame.

5. In a traveling harvester and in combination with the threshing-machine frame thereof, bearing-wheels upon opposite sides of the frame having independent shafts and journal-boxes therefor, a mechanism consisting of screw-shafts engaging threaded openings in the boxes of each wheel, a horizontal shaft journaled upon a frame, beveled gears by which the motion of said shaft is transmitted to turn the screw-shafts and move the journal-boxes of the two wheels simultaneously in opposite directions, a clutch mechanism whereby the movement of the driving-shaft may be reversed, and a mechanism consisting of fulcrumed bell-crank levers, one arm of each of which is connected with the movable member of the clutch, and a part which moves in unison with the bearing-wheels engaging the other arm whereby the clutch is automatically disengaged when the bearing-wheels have reached the limit of their movement.

6. In a traveling harvester and in combination with the threshing-machine frame thereof, bearing-wheels upon opposite sides of the frame having independent shafts and journal-boxes therefor, guides fixed to the thresher-frame within which the journal-boxes are movable, said guides having transverse top plates, screws turnable in threaded openings in the journal-boxes, and mechanism for turning and reversing them to move the boxes of each wheel simultaneously in opposite directions, said screws passing through the top plates of the guides, and collars upon the screws upon which the plates and the weight of the machine is supported.

7. In a traveling harvester and in combination with the threshing-machine frame thereof, bearing-wheels upon opposite sides of the frame having independent shafts and journal-boxes therefor, a mechanism consisting of screw-shafts engaging the boxes of each wheel, a horizontal shaft journaled upon a frame, beveled gears by which the motion of said shaft is transmitted to turn the screw-shafts and move the journal-boxes of the two wheels simultaneously in opposite directions, a clutch mechanism whereby the movement of the driving-shaft may be reversed, and a mechanism consisting of fulcrumed bell-crank levers, one arm of which is connected with the movable member of the clutch and a part which moves in unison with the bearing-wheels engaging the other arm whereby the clutch is automatically disengaged when the bearing-wheels have reached the limit of their movement.

In witness whereof I have hereunto set my hand.

WALTER CORLOS MATTESON.

Witnesses:
JOSEPHINE M. HOGAN,
P. E. HOLT.